United States Patent [19]
Okuda et al.

[11] Patent Number: 5,246,894
[45] Date of Patent: Sep. 21, 1993

[54] SILICON CARBIDE REINFORCED COMPOSITE MATERIAL

[75] Inventors: Hiroshi Okuda; Itsuro Imazu, both of Gotenba, Japan

[73] Assignee: Tokai Carbon Co., Ltd., Tokyo, Japan

[21] Appl. No.: 858,016

[22] Filed: Mar. 26, 1992

[30] Foreign Application Priority Data

Mar. 29, 1991 [JP] Japan ................................ 3-91091
Apr. 12, 1991 [JP] Japan ............................... 3-108900

[51] Int. Cl.$^5$ ...................... C04B 35/56; C04B 35/80
[52] U.S. Cl. ........................................ 501/88; 501/89; 501/92; 501/95; 501/97
[58] Field of Search ................. 501/89, 92, 95, 97, 501/88

[56] References Cited

U.S. PATENT DOCUMENTS

| | | | |
|---|---|---|---|
| 4,746,635 | 5/1988 | Inoue et al. | 501/89 |
| 4,849,381 | 7/1989 | Brandt et al. | 501/92 X |
| 4,889,835 | 12/1989 | Niihara et al. | 501/89 |
| 4,961,757 | 10/1990 | Rhodes et al. | 501/89 X |
| 5,110,770 | 5/1992 | Brandt et al. | 501/89 |
| 5,132,257 | 7/1952 | Kodama et al. | 501/92 X |

*Primary Examiner*—Karl Group
*Attorney, Agent, or Firm*—Armstrong, Westerman, Hattori, McLeland & Naughton

[57] ABSTRACT

A silicon carbide reinforced composite material comrpising a base material and, dispersed therein, a reinforcement comprising a silicon carbide whisker and an elliptical silicon carbide particle.

5 Claims, No Drawings

SILICON CARBIDE REINFORCED COMPOSITE MATERIAL

BACKGROUND OF THE INVENTION

The present invention relates to a silicon carbide reinforced composite material having a combination of a high fracture toughness with a high mechanical strength. More particularly, the present invention is concerned with a silicon carbide reinforced alumina composite material and a silicon carbide reinforced silicon nitride composite material.

Ceramic materials, such as alumina and silicon nitride, have been widely used as various structural materials for use under high-temperature conditions by virtue of their excellent mechanical strength and thermal and chemical stabilities.

Alumina and silicon nitride, however, have a disadvantage as a material in that the fracture toughness is poor. For this reason, in recent years, studies have been energetically conducted on an improvement in the fracture toughness. For example, various proposals have been made on a composite material comprising a ceramic base material and various whiskers.

The above-described improvement in the toughness of the ceramic derived from the compositing of the base material with a whisker has been thought to be attributable to the inhibition of the growth of crack occurring in the ceramic by virtue of the whisker dispersed in the sinter texture of the ceramic, the effect of increasing the critical strain energy release rate through the deviation of the direction of the progress of the crack by the whisker (the deflection effect), or the effect of prevent cracking by the whisker existing in the direction of progress of the crack (the pullout effect).

Although the incorporation of a large amount of a whisker in the ceramic base material is useful for improving the toughness of the base material, it is known that this lowers the strength of the base material [J. Am. Ceram. Soc., 72 (5), 791-798 (1989); and ibid., 65 (2), 351-356 (1986)].

This is because the incorporation of a large amount of the whisker makes it difficult to homogeneously disperse the whisker in the base material due to aggregation among the whiskers, so that smooth sintering of the composite material is apt to be inhibited.

In recent years, attention has been paid to a mechanism for improving the toughness by bridging the whisker, and it was reported that the compositing with a whisker having a large diameter was effective in improving the toughness [see The Ceramic Society of Japan "Proceeding of Fall Meeting of the Ceramic Society of Japan 1989", pp. 490-491]. The term "bridging" used herein is intended to mean such an effect that even after the crack has proceeded, the bonding between the whisker and the base material is held to lower the stress at the front end of the crack and also when the crack further proceeds and the whisker is pulled out, the stress of the front end of the crack is similarly lowered by frictional force between the whisker and the base material.

The present inventors proposed a process for producing a composite ceramic material having improved strength and toughness by compositing a ceramic base material with a silicon carbide particle having a mean particle diameter of 1 to 20 $\mu$m and/or a silicon carbide whisker having a mean diameter of 1 to 10 $\mu$m and an aspect ratio of 1 to 15 in a volume fraction (Vf) of 5 to 50% (see Japanese Patent Laid-Open No. 12066/1992). Further, it was reported that the toughness was improved by simultaneously incorporating a silicon carbide whisker and a silicon carbide particle into silicon nitride [J. Am. Ceram. Soc., 73 (3) 678-683 (1990)], though the strength was lower than that when only the silicon nitride was used. The present invention has been made based on a finding that the incorporation of an elliptical silicon carbide particle together with the silicon carbide whisker is effective in improving the toughness through the incorporation of the silicon carbide whisker while maintaining the strength inherent in the silicon nitride base material.

SUMMARY OF THE INVENTION

A first object of the present invention is to provide a silicon carbide reinforced alumina composite material having a combination of excellent fracture toughness with excellent mechanical strength.

A second object of the present invention is to provide a silicon carbide reinforced silicon nitride composite material similarly having a combination of excellent fracture toughness with excellent machanical strength.

These objects of the present invention can be attained by a silicon carbide reinforced composite material comprising a base material and, dispersed therein, a reinforcement comprising a silicon carbide whisker and an elliptical silicon carbide particle. The base material may comprise alumina. In this case, the mean diameter and aspect ratio of the silicon carbide whiskers are 0.3 to 1.2 $\mu$m and 10 to 40, respectively. The mean diameter and aspect ratio of the elliptical silicon carbide particles are 2 to 8 $\mu$m and 2 to 7, respectively. The volume fraction (Vf) of the reinforcement is 5 to 50%. Alternatively, the base material may comprise silicon nitride. In this case, the mean diameter and aspect ratio of the silicon carbide whiskers are the same as those described above. The mean diameter and aspect ratio of the elliptical particles of silicon carbide are 2 to 10 $\mu$m and 2 to 8, respectively. The volume fraction (Vf) of the reinforcement is 5 to 40%.

PREFERRED EMBODIMENTS OF THE INVENTION

In the present invention, alumina or silicon nitride is used as the base material to be reinforced. A combination of a silicon carbide whisker with a silicon carbide particle is used as a reinforcement for the base materials. The silicon carbide whisker mainly contributes to an improvement in the strength of the base material, and the mean diameter and the aspect ratio are 0.3 to 1.2 $\mu$m and 10 to 40, respectively. When the mean diameter is less than 0.3 $\mu$m or the aspect ratio is less than 10, the silicon carbide whisker becomes liable to aggregate, so that the dispersion into the base material becomes difficult. When the mean diameter exceeds 1.2 $\mu$m, the effect of improving the strength of the base material lowered. When the aspect ratio exceeds 40, the densification of the texture of the composite material is obstructed. The silicon carbide particle serves mainly to improve the fracture toughness of the base material. When the base material is alumina, the mean diameter in terms of minor axis and the aspect ratio are 2 to 8 $\mu$m and 2 to 7, respectively. That is, the silicon carbide particle is elliptical. When the mean diameter is less than 2 $\mu$m or the aspect ratio is less than 2, the above-described bridging effect and deflection effect become insufficient, so that the toughness of the alumina base material cannot be expected. On the other hand, when the means diameter exceeds 8 μm or the aspect ratio exceeds 7, there is a possibility that micro-cracking occurs due to a difference in the thermal expansion between the base material and the elliptical silicon carbide particle. When the base material is silicon nitride, the mean diameter and the aspect ratio of the silicon carbide particle are 2 to 10 μm and 2 to 8, respectively. That is, as with the case of the alumina base material, the silicon carbide particle is elliptical also when the base material is silicon nitride. When the mean diameter is less than 2 μm or the aspect ratio is less than 2, the deflection effect (the relaxation of the stress concentration) and bridging effect become insufficient, so that no improvement in the toughness of the silicon nitride base material can be expected. When the mean diameter exceeds 10 μm or the aspect ratio exceeds 8, the effect of improving the strength and the toughness lowered.

In the present invention, the above-described reinforcement comprising the silicon carbide whisker and the elliptical silicon carbide particle is homogeneously dispersed in a volume fraction (Vf) of 5 to 50%, preferably 15 to 40% in an alumina base material.

When the volume fraction (Vf) is less than 5%, the effect derived from the use of a combination of the silicon carbide whisker with the elliptical silicon carbide particle is not observed. When the volume fraction (Vf) exceeds 50%, no improvement in the property is expected and it becomes difficult to conduct sintering in the production of the composite material.

When the base material is alumina, the mixing ratio of the silicon carbide whisker to the elliptical silicon carbide particle in the reinforcement ranges from 70:30 to 30:70 in terms of volume ratio. When the silicon carbide whisker and the elliptical silicon carbide particle are mixed with each other in the above-described mixing ratio, a good balance between strength and toughness can be imparted to the alumina base material. The volume fraction (Vf) of the reinforcement comprising the silicon carbide whisker and the elliptical silicon carbide particle in the case of use of silicon nitride as the base material ranges from 5 to 40%, preferably from 15 to 35%. When the volume fraction (Vf) is less than 5%, the effect attained by the use of a combination of the silicon carbide whisker with the elliptical silicon carbide particle is not observed. When the volume fraction (Vf) exceeds 40%, no improvement in the strength and toughness is expected and rather the sinterability lowered.

The mixing ratio of the silicon carbide whisker to the elliptical silicon carbide particle ranges from 60:40 to 40:60. When both materials are mixed with each other in the above-described range, a good balance between strength and toughness can be provided to the silicon nitride base material.

The silicon carbide whisker to be used in the present invention can be easily produced, for example, by a method described in Japanese patent application Kokai publication No. 57-209813, No. 58-125697, No. 58-145700, No. 58-20799 or No. 61-40899.

The elliptical silicon carbide particle can be prepared, for example, by a method described in Japanese patent application Kokai publication No. 66-37198 or No. 66-141200.

The silicon carbide reinforced composite material of the present invention can be produced by mixing a reinforcement comprising the silicon carbide whisker and the elliptical silicon carbide particle having the above-described properties with an alumina powder or a silicon nitride powder so as to attain the above-described volume fraction, placing the resultant mixture in a mold and sintering the mixture in a non-oxidizing gas atmosphere, for example, a nitrogen atmosphere under atmospheric pressure, single-screw pressing or isotropic pressing.

The sintering temperature is about 1600° C. when the base material is alumina, and 1600° to 1850° C. when the base material is silicon nitride. When the base material is silicon nitride, it is preferred to add 3 to 15% by weight of a sintering assistant, such as $Y_2O_3$, $Al_2O_3$ or MgO, to the above-described powder mixture.

According to the silicon carbide reinforced composite material of the present invention, since the silicon carbide whisker having specified mean diameter and aspect ratio deviates the direction of progress of the crack (the deflection effect) and pulls out the crack developing energy (the pullout effect), not only the fracture toughness can be improved but also the growth of the base material particle can be prevented during sintering in the production of a composite material, so that the strength of the composite material can be enhanced. The deflection effect and bridging effect attained by the coexisting elliptical silicon carbide particle having specified mean diameter and aspect ratio serve to locally relax the stress at the front end of the crack to further improve the fracture toughness of the base material. The effect attained by the silicon carbide particle is particularly significant since the silicon carbide particle is elliptical, and this effect is superior to that of the silicon carbide particle in spherical or disklike form. Further, since the silicon carbide particle is elliptical, it is easy to mix the silicon carbide particle with the base material powder and the silicon carbide whisker, and fill the resultant mixture into a mold in the production of a composite material, so that sintering can be successfully conducted as well.

Further, in the present invention, since the silicon carbide whisker and the silicon carbide particle are dispersed as a reinforcement in the specified volume fraction (Vf) in the base material, it is possible to attain a balance between the effect of improving the toughness and the effect of improving the strength by the silicon carbide whisker and silicon carbide particle, so that a silicon carbide reinforced composite material having a combination of a high fracture toughness with a high mechanical strength can be prepared.

The present invention will now be described in more detail with reference to the following Examples.

EXAMPLES 1 TO 9 AND COMPARATIVE EXAMPLES 1 TO 4

An alumina powder having a mean particle diameter of 0.2 μm [AKP-53, manufactured by Sumitomo Chemical Co., Ltd ] was placed together with ethanol in a ball mill, and the ball mill was rotated to prepare a slurry. A silicon carbide whisker and an elliptical silicon carbide particle each having properties specified in Table 1 were added thereto under conditions specified in Table 1, and sufficient agitation and mixing were conducted in a wet state.

The resultant mixed slurry was dried and granulated by spray drying and sintered in a vacuum under the conditions of a pressure of 400 kg/cm², a temperature of 1600° C. and a time of 60 min.

The relative density, flexural strength and fracture toughness of the resultant silicon carbide reinforced alumina composite material were measured, and the results are given in Table 2. The flexural strength was measured by the three-point bending test (JIS R 1601) and the fracture toughness was measured by the IF method (JIS R 1607, load: 20 kg, time: 15 sec), respectively. In the Table 2, Comparative Example 4 is sinter prepared by hot-pressing an alumina powder alone at 1400° C. for 30 min.

COMPARATIVE EXAMPLE 6

A silicon carbide reinforced alumina composite material was prepared in the same manner as that of the Comparative Example 5, except that a silicon carbide particle in disklike form having a particle diameter of 40 μm ("SiC Platelet", manufactured by American Matrix Inc.) was used instead of the elliptical silicon carbide particle used in the Example 1. The properties of the composite material are summarized in Table 3.

TABLE 1

| Ex. No. | SiC whisker particle diameter (μm) | SiC whisker aspect ratio | Elliptical SiC particle particle diameter (μm) | Elliptical SiC particle aspect ratio | Blending ratio (vol. %) | Volume fraction (%) |
|---|---|---|---|---|---|---|
| Ex. | | | | | | |
| 1 | 0.5 | 15 | 2.6 | 7 | 70:30 | 20 |
| 2 | " | " | " | " | 50:50 | 35 |
| 3 | " | " | 4.4 | 5 | 30:70 | 20 |
| 4 | " | " | " | " | 50:50 | 35 |
| 5 | " | " | 7.6 | 3 | 70:30 | 10 |
| 6 | " | " | " | " | 30:70 | 35 |
| 7 | 1.0 | 30 | 2.6 | 7 | 50:50 | 35 |
| 8 | " | " | 7.6 | 3 | 30:70 | 35 |
| 9 | 0.5 | 15 | 2.6 | 7 | 40:60 | 45 |
| Comp. Ex. | | | | | | |
| 1 | " | " | 0.5 | 2 | 50:50 | 35 |
| 2 | 1.0 | 30 | 11.0 | 3 | 30:70 | 35 |
| 3 | 0.5 | 15 | 2.6 | 7 | 60:40 | 60 |

TABLE 2

| Ex. No. | Relative density (%) | Flexural strength (MPa) | Fracture toughness (MPa · m$^{\frac{1}{2}}$) |
|---|---|---|---|
| Ex. | | | |
| 1 | 99 or more | 751 | 4.8 |
| 2 | " | 797 | 5.6 |
| 3 | " | 707 | 5.5 |
| 4 | " | 768 | 5.8 |
| 5 | " | 682 | 4.4 |
| 6 | " | 720 | 5.9 |
| 7 | " | 695 | 5.7 |
| 8 | " | 720 | 5.7 |
| 9 | 98.9 | 700 | 5.0 |
| Comp. Ex. | | | |
| 1 | 98.8 | 680 | 3.6 |
| 2 | 99 or more | 463 | 3.4 |
| 3 | 97.0 | 392 | — |
| 4 | 99 or more | 580 | 3.1 |

From the results shown in the Table 2, it is apparent that all of the Examples having compositions falling within the scope of the present invention exhibit an improvement in not only the strength but also the toughness over the Comparative Examples having compositions outside the scope of the present invention.

COMPARATIVE EXAMPLE 5

A silicon carbide reinforced alumina composite material having a volume fraction of 35% was prepared in the same manner as that of the Example 1, except that a spherical silicon carbide particle having a particle diameter of 1.8 μm (GMF-6S, manufactured by Pacific Random Co., Ltd.) and a silicon carbide whisker having a mean diameter of 0.5 μm and an aspect ratio of 15 were mixed with each other in a volume ratio of 30:70 instead of the elliptical silicon carbide particle used in the Example 1. The properties of the composite material are given in Table 3.

TABLE 3

| Ex. No. | Relative density (%) | Flexural strength (MPa) | Fracture toughness (MPa · m$^{\frac{1}{2}}$) |
|---|---|---|---|
| Comp. Ex. | | | |
| 5 | 99 or more | 630 | 3.6 |
| 6 | " | 584 | 4.1 |

From the comparison of the Table 3 with the Table 2, it is apparent that when use is made of a silicon carbide particle in spherical or disklike form, the flexural strength and fracture toughness of the comparative materials are lower than those of the composite materials of the present invention.

EXAMPLES 10 TO 17 AND COMPARATIVE EXAMPLES 7 TO 11

A silicon nitride powder (SN-E10, manufactured by Ube Industries, Ltd.) having a mean particle diameter of 0.2 μm and containing $Y_2O_3$ and $Al_2O_3$ each in an amount of 5% added as a sintering assistant was used as a matrix, and a silicon carbide whisker and an elliptical silicon carbide particle each having properties specified in Table 4 were added thereto under conditions specified in Table 4. The resulting mixture was placed together with ethanol in a ball mill, and sufficient agitation and mixing were conducted in a wet state.

Comparative Examples 7 and 8 are each an experiment wherein the properties of the elliptical silicon carbide particle do not satisfy particular requirements as specified in the present invention, Comparative Example 9 is an experiment wherein use was made of a sinter comprising silicon nitride alone, Comparative Example 10 is an experiment wherein the base material was composited with a silicon carbide whisker alone, and Comparative Example 11 is an experiment wherein the base material was composited with an elliptical silicon carbide particle alone.

TABLE 1

| Ex. No. | SiC whisker particle diameter (μm) | SiC whisker aspect ratio | Elliptical SiC particle particle diameter (μm) | Elliptical SiC particle aspect ratio | Blending ratio (vol. %) | Volume fraction (%) |
|---|---|---|---|---|---|---|
| Ex. | | | | | | |
| 10 | 0.5 | 15 | 2.6 | 7 | 60:40 | 20 |
| 11 | " | " | " | " | 40:60 | 20 |
| 12 | " | " | 4.4 | 5 | 40:60 | 35 |
| 13 | " | " | 7.6 | 3 | 50:50 | 15 |
| 14 | 1.0 | 30 | 2.6 | 7 | 60:40 | 20 |
| 15 | " | " | " | " | 40:60 | 35 |
| 16 | " | " | 4.4 | 5 | 50:50 | 20 |
| 17 | " | " | 7.6 | 3 | 40:60 | 20 |
| Comp. Ex. | | | | | | |
| 7 | 0.5 | 15 | 1.0 | 2 | 50:50 | 20 |
| 8 | 0.5 | 15 | 12 | 10 | 10:90 | 35 |
| 9 | — | — | — | — | — | — |
| 10 | 1.0 | 30 | — | — | — | 20 |
| 11 | — | — | 2.6 | 7 | — | 20 |

The resultant mixed slurry was dried and granulated by spray drying and sintered under the conditions of a nitrogen atmosphere of 600 Torr, a pressure of 400 kg/cm$^2$, a temperature of 1750° C. and a time of 30 min.

Each of the silicon carbide reinforced silicon nitride composite materials thus obtained was worked into a test piece to measure the relative density, flexural strength and fracture toughness thereof, and the results are given in Table 5. The flexural strength and the fracture toughness were measured respectively by the three-point bending test (JIS 1601) and the IF method (load: 20 kg, time: 15 sec, Hv) and the SEPB method in some cases.

TABLE 5

| Ex. No. | Relative density (%) | Flexural strength (MPa) | Fracture toughness (MPa · m$^{\frac{1}{2}}$) |
|---|---|---|---|
| Ex. | | | |
| 10 | 98.4 | 1160 | 8.2 |
| 11 | 98.5 | 1090 | 9.4 |
| 12 | 98.3 | 1010 | 8.6 |
| 13 | 98.5 | 1000 | 9.6 |
| 14 | 98.3 | 1200 | 9.1 |
| 15 | 98.2 | 1080 | 9.9 |
| 16 | 98.5 | 1100 | 9.7 |
| 17 | 98.1 | 1000 | 9.0 |
| Comp. Ex. | | | |
| 7 | 98.1 | 1100 | 7.8 |
| 8 | 98.3 | 680 | 6.5 |
| 9 | 99.1 | 990 | 5.6 |
| 10 | 98.2 | 1100 | 7.4 |
| 11 | 98.7 | 900 | 7.5 |

From the results shown in the Table 5, it is apparent that all of the Examples having compositions falling within the scope of the present invention exhibit an improvement in not only the strength but also the toughness over the Comparative Examples.

As has been described above, according to the present invention, a high-quality silicon carbide reinforced composite material having a combination of excellent fracture toughness with excellent mechanical strength can be provided through the use of a combination of a silicon carbide whisker with an elliptical silicon carbide particle as a reinforcement under specified conditions. The composite material of this type is useful as a member of a cutting tool and so forth.

What is claimed is:

1. A silicon carbide reinforced composite material comprising a base material and, dispersed therein, a reinforcement comprising an silicon carbide whiskers and an elliptical silicon carbide particles having a mean diameter and aspect ratio are 2 to 8 μm and 2 to 7, respectively.

2. A silicon carbide reinforced composite material according to claim 1, wherein the base material comprises alumina, the mean diameter and aspect ratio of the silicon carbide whisker are 0.3 to 1.2 μm and 10 to 40 respectively, and the volume fraction (Vf) of the reinforcement is 5 to 50%.

3. A silicon carbide reinforced composite material comprising a base material and, dispersed therein, a reinforcement comprising silicon carbide whiskers and elliptical silicon carbide particles, wherein the base material comprises silicon nitride, the mean diameter and aspect ratio of the silicon carbide whisker are 0.3 to 1.2 μm and 10 to 40, respectively, the mean diameter and aspect ratio of the elliptical silicon carbide particle are 2 to 10 μm and 2 to 8, respectively, and the volume fraction (Vf) of the reinforcement is 5 to 40%.

4. A silicon carbide reinforced composite material according to claim 2, wherein the volume ratio of the silicon carbide whisker to the elliptical silicon carbide particle in the reinforcement ranges from 70:30 to 30:70.

5. A silicon carbide reinforced composite material according to claim 3, wherein the volume ratio of the silicon carbide whisker to the elliptical silicon carbide particle in the reinforcement ranges from 60:40 to 40:60.

* * * * *